(12) United States Patent
Liu

(10) Patent No.: US 8,695,488 B2
(45) Date of Patent: Apr. 15, 2014

(54) MULTI-FUNCTION INDUCTION COOKER

(75) Inventor: Sen-Chuan Liu, Taipei County (TW)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 0 days.

(21) Appl. No.: 13/338,951

(22) Filed: Dec. 28, 2011

(65) Prior Publication Data

US 2012/0168432 A1  Jul. 5, 2012

(30) Foreign Application Priority Data

Dec. 29, 2010  (CN) .......................... 2010 1 0612312

(51) Int. Cl.
*A47J 37/06* (2006.01)
*A47J 37/08* (2006.01)
*A21B 1/00* (2006.01)
*A21B 1/22* (2006.01)

(52) U.S. Cl.
USPC ................................ 99/372; 99/380; 219/403

(58) Field of Classification Search
USPC ........... 99/378, 389, 380, 372, 377, 391, 331; 219/386, 403, 620, 621, 622, 627
See application file for complete search history.

(56) References Cited

U.S. PATENT DOCUMENTS

| 2,765,727 A | * | 10/1956 | Lipsich et al. | .................. 99/331 |
| 2004/0050256 A1 | * | 3/2004 | Patenotre | ......................... 99/331 |
| 2005/0247210 A1 | * | 11/2005 | Ragan | .............................. 99/372 |
| 2007/0221653 A1 | * | 9/2007 | Krishnan | ................... 219/450.1 |
| 2008/0257170 A1 | * | 10/2008 | Ho et al. | ......................... 99/378 |

* cited by examiner

*Primary Examiner* — Henry Yuen
*Assistant Examiner* — Michael LaFlame, Jr.
(74) *Attorney, Agent, or Firm* — Rabin & Berdo, P.C.

(57) ABSTRACT

A multi-function induction cooker comprises: a left body with a left upper cover and a corresponding lower left cover, a left supporting board for supporting the heating plate disposed on the left upper cover, a left electromagnetic induction component disposed inside the chamber between the left upper and left lower cover; a right body connected on the right side of the left body, and the right body can be returned on the upper surface of the left body to a folded status, or an unfolded status; wherein a status switching device for switching the folded and unfolded status is disposed on the left or right body, and said status switching device can switch the power proportion between the two bodies in folded or unfolded status. With the multi-function induction cooker: the food can be heated from the top and the bottom, and pans can be heated on both surfaces simultaneously.

7 Claims, 5 Drawing Sheets

MULTI-FUNCTION INDUCTION COOKER

FIELD OF THE INVENTION

The present invention relates to an induction cooker, more particularly, to a multi-function induction cooker which is foldable and can heat the food by double surfaces.

BACKGROUND OF THE INVENTION

Induction cooker is one of the electric family appliance, many types of induction cooker are sold in market, however, the heating surface(s) of traditional induction cookers with one or more heating surfaces is/are in a plate, and the food only can be heated by one surface; Additionally, traditional cookers with one or more heating surfaces are heated by heat conduction or heat radiation of the electric tube, thus the pans or heating plates have lower heating effect, lower power effect and long pre-heating time. because the contacting heating conduction, the pans or the heating plates of traditional cookers are easy to be distorted, and then lower the heating speed and the food is cooked un-uniformity.

Besides the above disadvantages, the induction cookers in market usually have no temperature detecting function; or some may has detecting function, but because the temperature detecting device are embedded under the heating board, while the heating board are usually made by low thermal conduction material such as crystallite glass, so the temperature detecting is not precise. On the other side, to make the best of time, we usually need to simmer (such as bone soup) and quick cooking (such as fried dish) at the same time in making food, traditional cooker with double heating surfaces needed to has a heating device and an operational device on each side respectively, in use, the operation device must be operated respectively, the operation is fussy. So both the induction cookers and traditional cookers have many defect.

SUMMARY OF THE INVENTION

The primary object of the present invention is to provide a multi-function induction cooker to obviate the above disadvantages in background. By structure and electric design, the multi-function induction cooker of the present invention has the following function: the food can be heated both from the top and from the bottom, pans can be heated on both the two surfaces at the same time, the temperature detecting is precise, and the operation is convenient.

The object is achieved by providing:

a multi-function induction cooker comprising:

a left body with a left upper cover and a corresponding lower left cover, herein a left supporting board for supporting the heating plate is disposed on the left upper cover, a left electromagnetic induction component is disposed inside the chamber between the left upper cover and the left lower cover;

a right body connected on the right side of the left body, and the right body can be returned on the upper surface of the left body to be a folded status, or on a unfolded status; the right body has a right upper cover and a corresponding lower right cover, herein a right supporting board for supporting the heating plate is disposed on the right upper cover, aright electromagnetic induction component is disposed inside the chamber between the right upper cover and the right power cover;

wherein a status switching device for switching the folded status and the unfolded status is disposed on the left body or the right body, and said status switching device can switch the power proportion between the two bodies in folded status or unfolded status.

Said status switching device comprises a status switch and magnet coils disposed in the two bodies.

Said magnet coils comprises at least three coils, wherein the first coil is disposed in a body, the second and third coil are disposed in the other body, on the first connecting status, the switch is selectively connect one of the second or third coil to the first coil, on the second connecting status, three coils are connected in series.

Said status switch is disposed in about the connecting portion between the left body and the right body, in unfolded status, the switch is pressed down by the right body, in folded status, the switch is released, thus to switch the first connecting status and the second connecting status.

At least one of the body is disposed with an exposed temperature detector, said temperature detector is pass through the upper cover and the supporting board.

Said left body and right body have pan fixing device;

Said pan fixing device is several clamping hooks disposed on the flange of the upper surface of the body.

Advantages of the present invention:

1/heating by double surfaces, traditional electric heating tube is replaced by electromagnetic induction, which has high effect and short heating time.

2/the two heating surfaces can be folded to be an appliance which can heat the food both from top and bottom sides (such as in cooking cake or grilling meat), or unfolded to be an appliance which can be place pans both on left and right side in a time. By add a status switching switch, the power proportion between the two bodies in folded status or unfolded status can by automatically switched, then in grilling the food can be heated uniformly both from the top and the bottom, and in unfolded status, one body can quick cooking and the other body simmer ate the same time.

3/the two heating surfaces are controlled by one control and driving circuit, thus the circuit and structure cost can be reduced.

4/the power and heating area of the two surfaces can be distributed to obtain better heating condition by electric and circuit design.

5/compared to traditional product heated by heating contacting conduct, the present invention is heated by induction and is not by contacting, and by detachable pan, the pan of the present invention is easy to be separated and cleaned, heating effect is stable even if the pan is distorted, and the pan can be selected according to different use.

Figure 1:
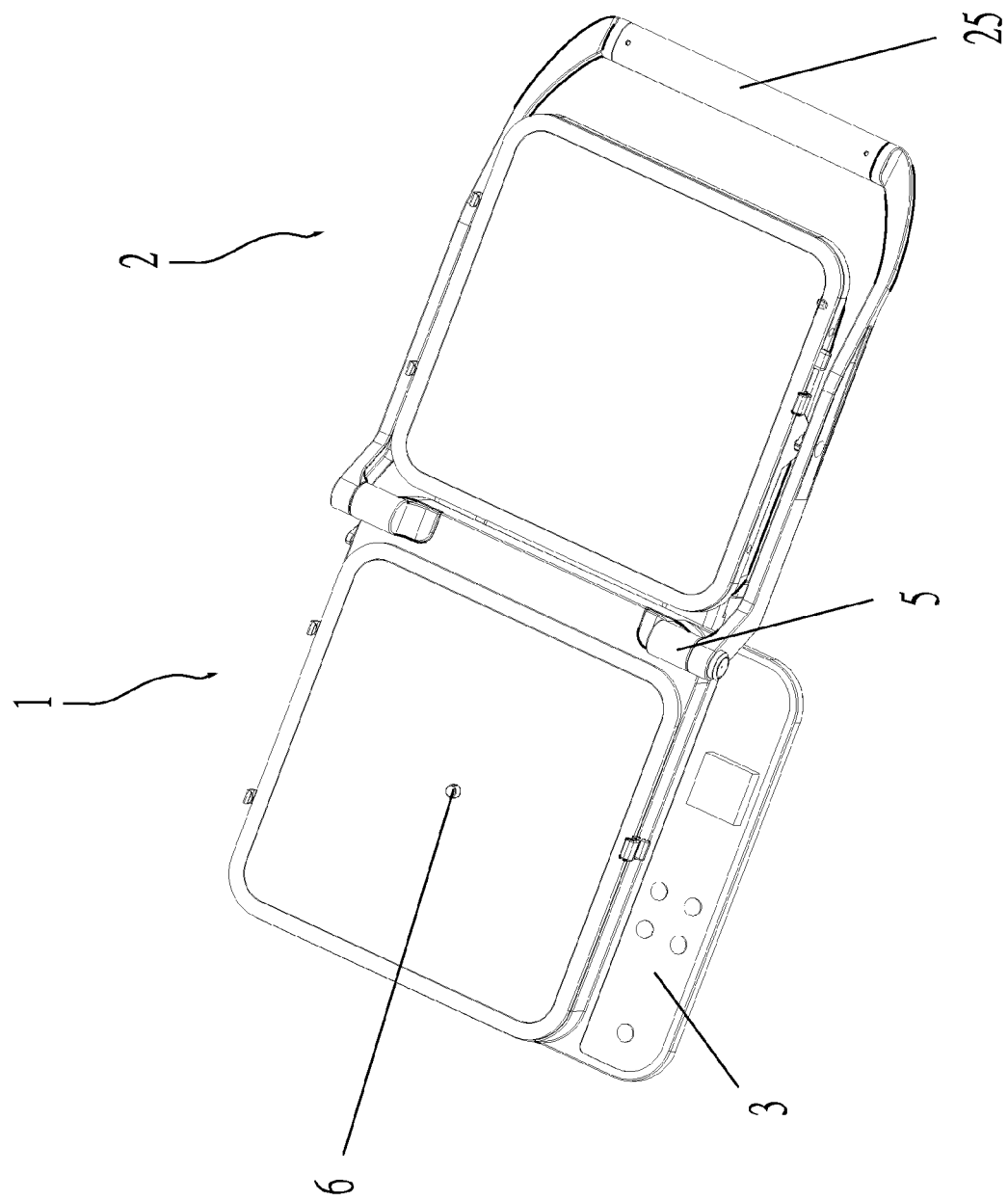
FIG. 1 is the perspective view in unfolded status of the present invention.

1/ left body
11 left upper cover
12 left lower cover
13 left electromagnetic component
14 left supporting board 15 angle adjusting mechanism
16 PCB
17 fan
18 angle adjusting board
2/ right body
21 right upper cover
22 right lower cover
23 right electromagnetic component
24 right supporting board
25 handle
26 fixing device for pan
3/ operation board
4 fold-unfolded status switching switch
5 rotating shaft
6 exposed temperature detector

DETAILED DESCRIPTION OF THE PREFERRED EMBODIMENT

Referring to FIG. 1 to FIG. 4, a multi-function induction cooker comprises a left body 1 and a right body 2

The left body 1 has a left upper cover 11 and a corresponding lower left cover 12, a left supporting board 14 for supporting the heating plate is disposed on the left upper cover 11, a left electromagnetic induction component 13 is disposed inside the chamber between the left upper cover 11 and the left lower cover 12; the left electromagnetic induction component 13 is a electromagnetic coil for inducting the ferromagnetism material. The electrify in the coil will produce variation of the magnetic flux, then eddy current will be produced in the pan to heating the food. A PCB 16 for control power, time and temperature and a fan for dispersing heating inside the chamber are disposed inside the chamber.

An operating board 3 for setting the cooking time and temperature is disposed on one side of the top of the left body 1.

An angle adjusting board 18 and an angle adjusting mechanism 15 are disposed on the lower surface 12 of the left body on the side near the right body 2. A status switching board 4 for switching the power between the two bodies in folded and unfolded status is disposed on the angle adjusting board 18. Additionally, the angle adjusting board 18 and the status switching board 4 can support the right body 2 in unfolded status.

In the center of the left body 1, an exposed temperature detector 6 is protruded out the supporting board 14 for detecting the temperature of the pan directly, thus the temperature detecting is more precious compared to the traditional way to embedded the detector under the supporting board.

The right body 2 is pivotally connected on one side of the left body 1 by a pivot 5, and the right body has a right upper cover and a corresponding lower right cover, herein a right supporting board for supporting the heating plate is disposed on the right upper cover, a right induction component is disposed inside the chamber between the right upper cover and the right power cover; the right induction component 14 is a electromagnetic coil for inducting the ferromagnetism material. The electrify in the coil will produce variation of the magnetic flux, then eddy current will be produced in the pan to heating the food.

A handle 25 is disposed on the right side of the right body 2, and the right portion of the right body 2 is supported by the handle 25 in unfolded status.

Several clamping hooks 26 are disposed on the left and right body respectively for fixing the pan, and then the pan can be detachably connected on the bodies. the pans are made by ferromagnetism material, such as metal-alloy or stainless steel etc.

Figure 3:
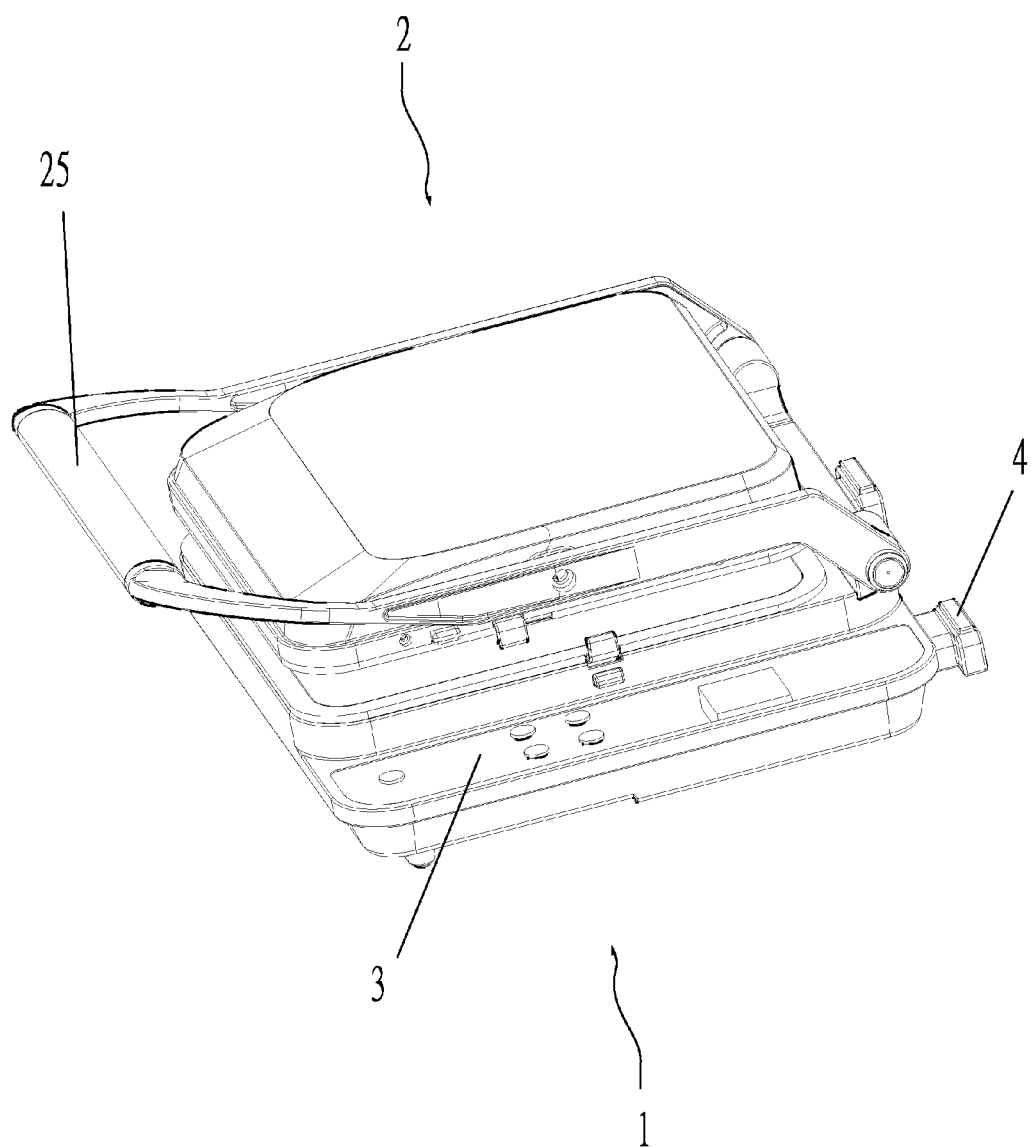
FIG. 3 is a perspective view in folded status of the present invention.
Figure 4:
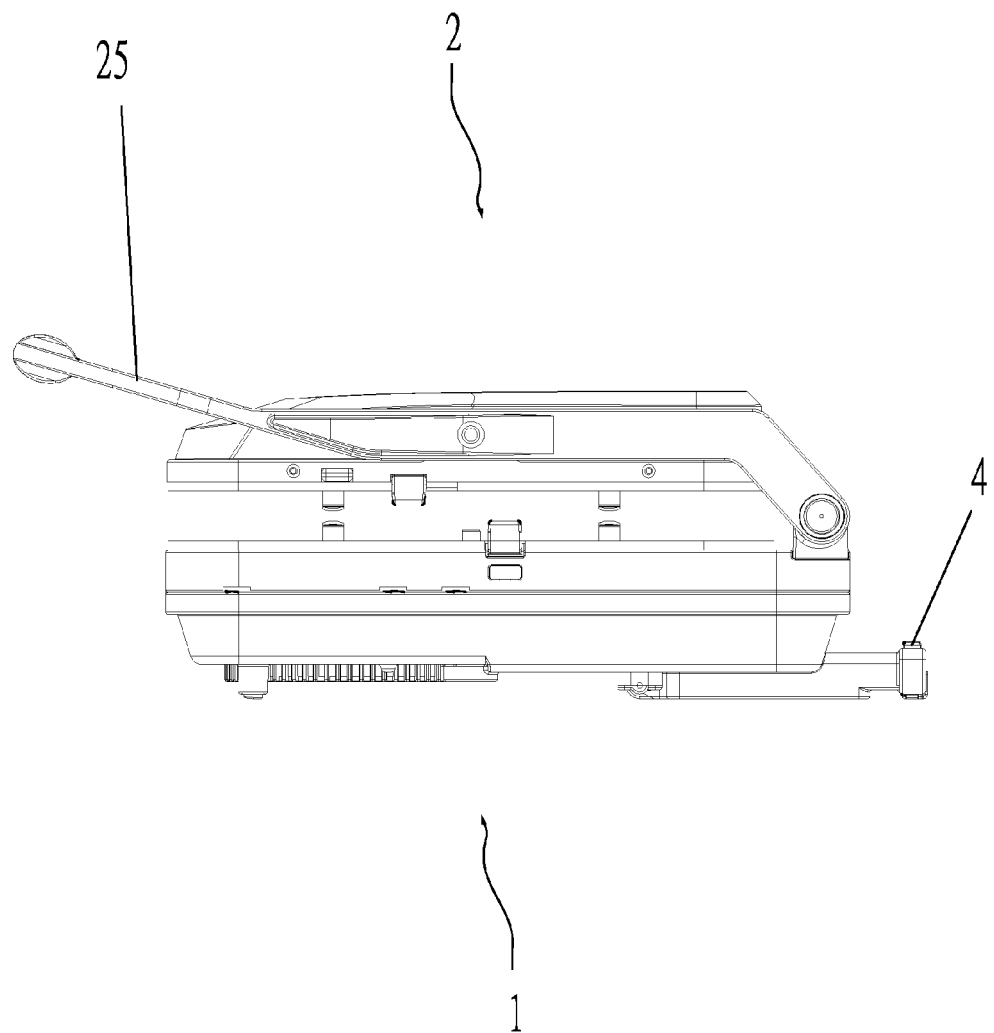
FIG. 4 is a front view in folded status of the present invention.
Figure 5:
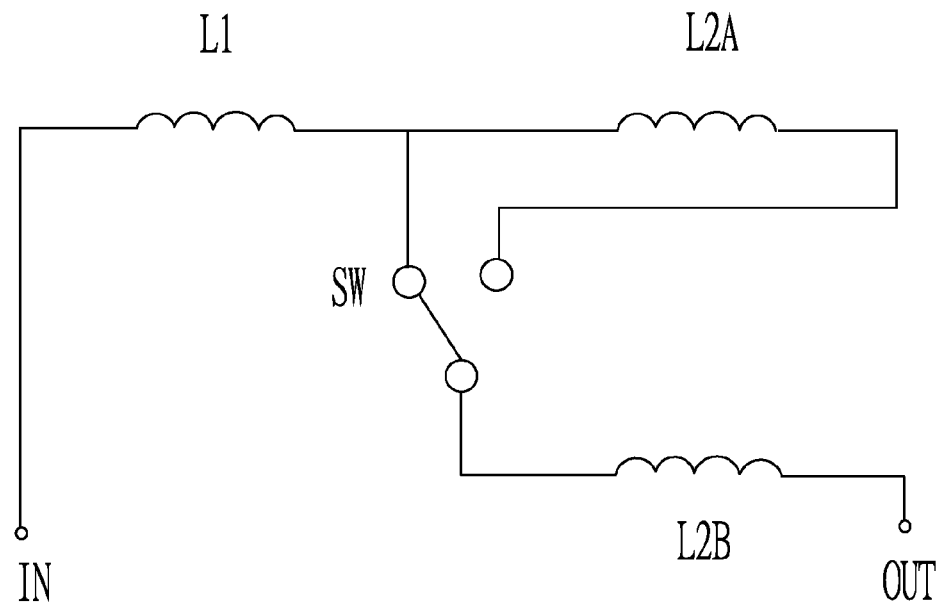
FIG. 5 is one circuit of the present invention.
Figure 6:
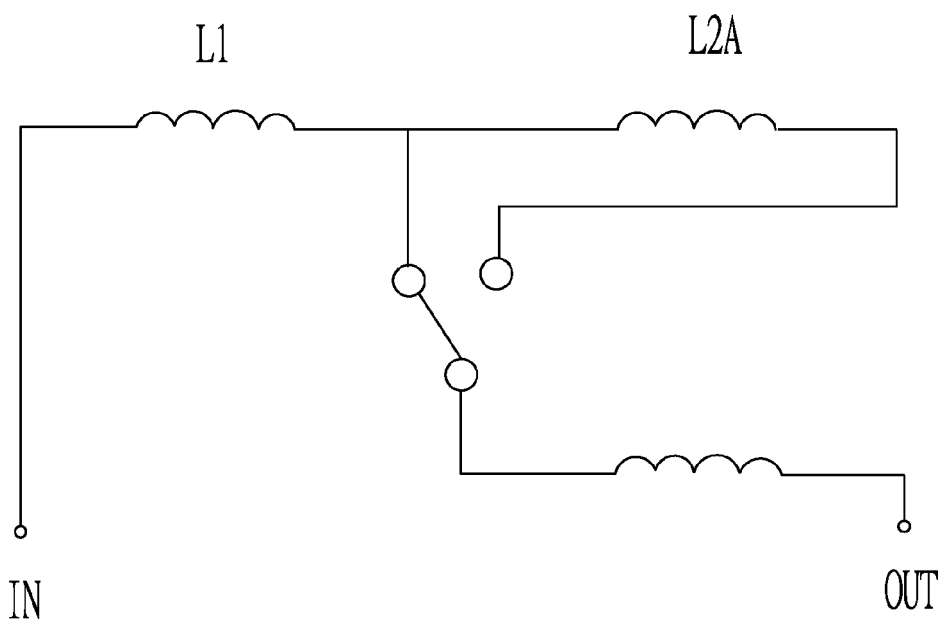
FIG. 6 is another circuit of the present invention.

The circuits of the present invention are shown in FIG. 5 and FIG. 6, the coil L1 is embedded in a heating surface, such as left body 1, and the coils L2A and L2B are embedded in the other heating surface, such as right body 2, then the power distribution between the two heating surface can be changed by switching:

1/referring to FIG. 3, FIG. 4 and FIG. 5, the two bodies are folded to be a grilling device, by controlling the circuit, the two heating surfaces can obtain 50% power of the total power, thus the food can be heated both from the top and from the bottom. the switching position is shown in FIG. 5 in grilling, the power of the upper heating surface=IH (total power) *$L1/(L1+L2B)$ the power of the lower heating surface=IH (total power) *$L2B/(L1+L2B)$, herein the $L1=L2B$ make $L1=L2B$, then the power of the lower surface and the upper surface are the same, thus is meet the requirement of double-surface heating in grilling.

Figure 2:
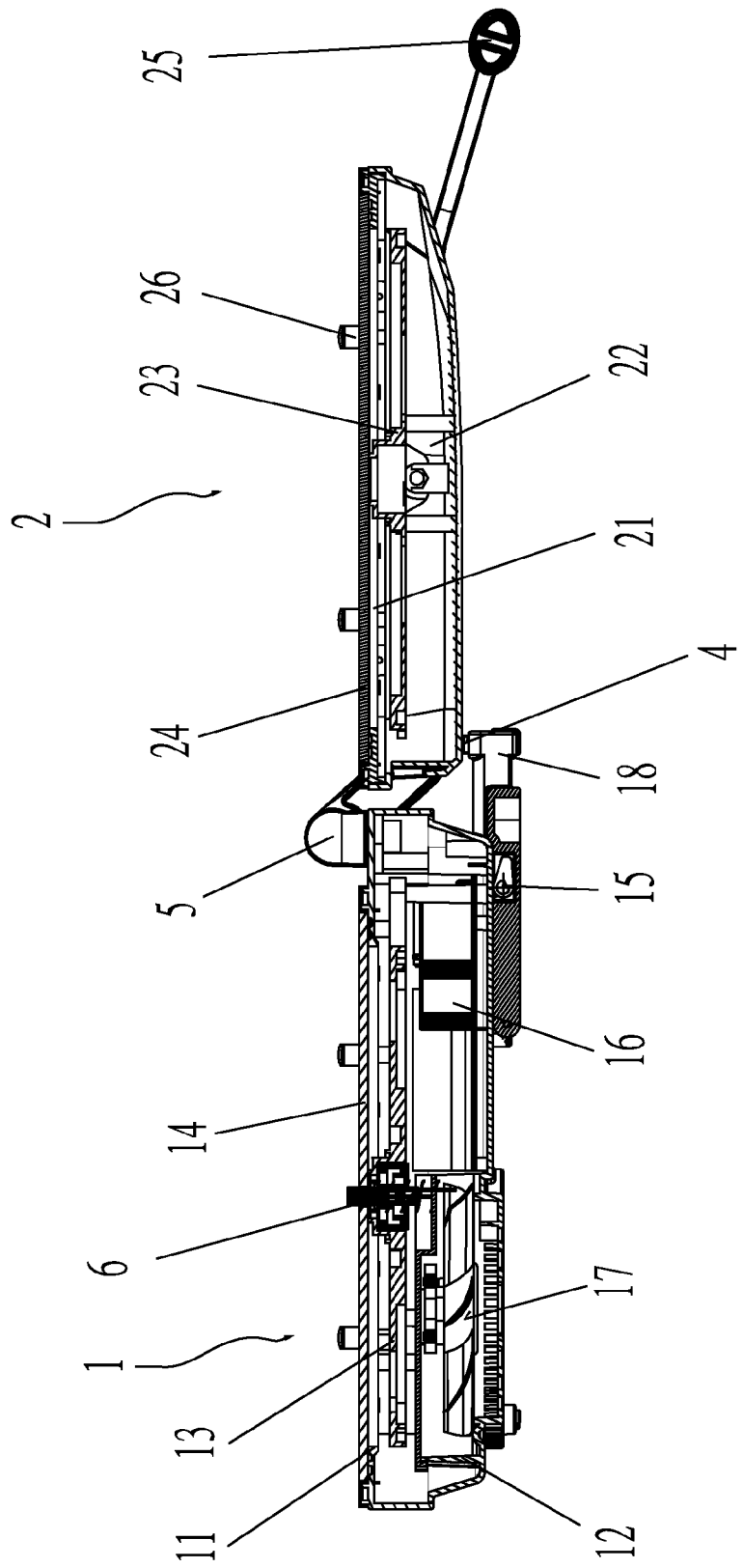
FIG. 2 is a sectional view in unfolded status of the present invention.

2/referring to FIG. 1, FIG. 2 and FIG. 6, the two bodies are folded to be a grilling device, by controlling the circuit, the two heating surfaces can obtain 75% power and 25% power of the total power respectively (the power distribution can be set by electric design), thus a surface can be used for quick cooking and the other can be used for simmer at the same time. The switching position is shown in FIG. 6, herein the switching position is the position of fold-unfolded status switching switch 4. in unfolded status the switch 4 is pressed by the weight of the right body 2, and in folded status the switch 4 is released, thus to switch the status of the bodies.

the equivalent power of the right heating surface=L2A+ LaB+Lm (Lm=mutual inductance induced between L2A and L2B)

the power of the left heating surface=IH (total power)*$L1/(L1+L2A+L2B+Lm)$, the power of the right heating surface=IH (total power)* $(L2A+L2B+Lm)/(L1+L2A+L2B+Lm)$ make $L1=L2B$, then the power of the right surface will higher than the power of the left surface, and by adjusting the number of turns of L2B, then the L2B and the Lm will be changed to adjusting the power distribution between the two heating surfaces for meeting requirements such as a surface is used for quick cooking and the other is used for simmer at the same time.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with detailed description, but rather by the claims appended hereto.

What is claimed is:

1. A multi-function induction cooker comprising:
    a left body including
        a left upper cover,
        a left lower cover corresponding to the left upper cover,
        a left supporting board for supporting a heating plate, the left supporting board being disposed on the left upper cover, and
        a left electromagnetic induction component disposed inside a chamber formed between the left upper cover and the left lower cover;
    a right body connected to a right side of the left body, the right body being movable towards and away from an upper surface of the left body so that the induction cooker is switchable among a folded status and an unfolded status, the right body including
- a right upper cover,
- a right lower cover corresponding to the right upper cover,
- a right supporting board for supporting the heating plate, the right supporting board being disposed on the right upper cover, and
- a right electromagnetic induction component disposed inside a chamber formed between the right upper cover and the right lower cover; and a status switching device being supported by only one of the left body and the right body so as to be selectively contacted by the other of the left body and the right body depending upon whether the induction cooker is in the folded status or the unfolded status, said status switching device controlling a power proportion between the left body and the right body, wherein in the unfolded status, the status switching device is contacted and pressed by the other of the left body and the right body so that the power proportion is controlled to be a first power ratio of power of the left body to power of the right body, further wherein in the folded status, the status switching device is released and free of any contact with the other of the left body and the right body so that the power proportion is controlled to be a second power ratio of the power of the left body to the power of the right body, further wherein the first power ratio is different than the second power ratio.

2. The multi-function induction cooker according to claim 1, wherein said status switching device comprises a status switch, and the left and right electromagnetic induction components are magnet coils.

3. The multi-function induction cooker according to claim 2, wherein said magnet coils comprise at least three coils, wherein
- the first coil is disposed in only one of the left body and the right body, the second and third coils are both disposed in the other of the left body and the right body that the first coil is not disposed within,
- in a first connecting status, said status switch selectively connects one of the second coil and the third coil to the first coil,
- in a second connecting status, the first, second and third coils are connected in series to each other.

4. The multi-function induction cooker according to claim 1, wherein at least one of the left body and the right body is disposed with an exposed temperature detector, said temperature detector passing through
- the right or left upper cover, and
- the right or left supporting board.

5. The multi-function induction cooker according to claim 1, wherein said left body and said right body include a pan fixing device.

6. The multi-function induction cooker according to claim 5, further comprising a flange on an upper surface of the left and right bodies, and wherein said pan fixing device is a plurality of clamping hooks disposed on the flange.

7. The multi-function induction cooker according to claim 1, wherein in the first power ratio, the power of the left body is not equal to the power of the right body.

* * * * *